(12) United States Patent
Martin et al.

(10) Patent No.: US 12,018,840 B2
(45) Date of Patent: Jun. 25, 2024

(54) COMBUSTOR ARRANGEMENT

(71) Applicant: ROLLS-ROYCE plc, London (GB)

(72) Inventors: Damian Martin, Derby (GB); James E Clissold, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/050,825

(22) Filed: Oct. 28, 2022

(65) Prior Publication Data

US 2023/0134139 A1    May 4, 2023

(30) Foreign Application Priority Data

Nov. 4, 2021  (GB) ...................... 2115850

(51) Int. Cl.
*F02C 7/28* (2006.01)
*F23R 3/28* (2006.01)

(52) U.S. Cl.
CPC ............... *F23R 3/283* (2013.01); *F02C 7/28* (2013.01); *F23R 2900/03044* (2013.01)

(58) Field of Classification Search
CPC ... F02C 7/28; F23R 3/283; F23R 2900/03044
See application file for complete search history.

(56) References Cited

U.S. PATENT DOCUMENTS

| | | | |
|---|---|---|---|
| 4,365,470 A | 12/1982 | Matthews et al. | |
| 4,454,711 A | 6/1984 | Ben-Porat | |
| 6,282,905 B1 * | 9/2001 | Sato | F23R 3/002 |
| | | | 60/757 |
| 6,415,609 B1 * | 7/2002 | Vacek | F02K 3/11 |
| | | | 60/761 |
| 2007/0068166 A1 | 3/2007 | Gautier et al. | |
| 2009/0224082 A1 | 9/2009 | MacMillan et al. | |
| 2016/0201908 A1 | 7/2016 | Drake et al. | |
| 2017/0370235 A1 * | 12/2017 | Konishi | F23R 3/28 |
| 2019/0145524 A1 | 5/2019 | Clemen | |

OTHER PUBLICATIONS

Mar. 23, 2023 Search Report issued in European Patent Application No. 22199699.4.

* cited by examiner

*Primary Examiner* — Todd E Manahan
*Assistant Examiner* — Rodolphe Andre Chabreyrie
(74) *Attorney, Agent, or Firm* — Oliff PLC

(57) ABSTRACT

A combustor arrangement includes a fuel injector, and a seal arranged around the fuel injector and having an upstream end and a downstream end. The seal includes an annular body at least partially abutting the fuel injector. The annular body includes an inner surface facing the fuel injector and an outer surface radially spaced apart from the inner surface relative to the central axis. The annular body further includes a plurality of slots disposed on the inner surface and circumferentially spaced apart from each other relative to the central axis. Each slot axially extends at least partially from the downstream end to the upstream end. Each slot is disposed in fluid contact with the fuel injector. The seal also includes a flange radially extending from the outer surface of the annular body at the upstream end.

19 Claims, 14 Drawing Sheets

COMBUSTOR ARRANGEMENT

CROSS-REFERENCE TO RELATED APPLICATIONS

This application claims priority pursuant to 35 U.S.C. 119(a) to United Kingdom Application No. 2115850.6, filed Nov. 4, 2021, which application is incorporated herein by reference in its entirety.

BACKGROUND

Field of the Disclosure

The present disclosure relates to a combustor arrangement and a gas turbine engine including the combustor arrangement.

Description of the Related Art

A combustor arrangement associated with a gas turbine engine typically includes one or more fuel injectors for supplying fuel into a combustion chamber during an operation of the gas turbine engine. The fuel injector is generally disposed in an aperture formed in a meter panel of the combustor arrangement. Further, the combustor arrangement includes one or more seals. Each seal surrounds and abuts with a corresponding fuel injector. Conventional seals include a generally annular structure and a flared portion. The seal is a floating component that ensures a seal is maintained with the meter panel during the operation of the gas turbine engine. The seal is subjected to hot combustion gases requiring the seal to be cooled using a cooling fluid for achieving a desired temperature of the seal. Thus, the seal includes a number of cooling apertures defined therein. In some examples, the cooling fluid may be air received from a compressor. The cooling fluid may reduce the temperature of the seal and/or a temperature of the fuel injector. The cooling apertures generally extend angularly with respect to a central axis of the seal.

The current design of the cooling apertures introduces the cooling fluid with an axial velocity component and a radial velocity component. Accordingly, the cooling fluid may be directed angularly through the cooling apertures, such that the cooling fluid is directed towards the flared portion thereby providing an impingement cooling of the flared portion. Further, the cooling fluid may be turned radially outwards by the flared portion. Moreover, a leakage flow may be achieved between the seal and the fuel injector providing a secondary cooling mechanism. The secondary cooling mechanism may not be effective as the leakage flow may be negligible and may close-off during an operation of the gas turbine engine.

Further, conventional seals may not provide an integrated cooling/mixing solution. More particularly, the design of conventional seals may not provide sufficient cooling of the seal as well as the fuel injector. In some examples, insufficient cooling of the seal may cause deterioration of the seal. More particularly, the impingement cooling on the flared portion may not be effective in reducing the temperature of the seal sufficiently to prevent melting and burn-back of the flared portion. Melting of the flared portion may cause release of material that may be deposited onto one or more components of the combustor arrangement. The deposition of molten material may lead to a blockage of the cooling apertures, which may further increase the temperature of the seal and/or the fuel injector, thereby reducing component life. Furthermore, melting of the flared portion may also lead to exposure of the fuel injector to elevated temperatures resulting in premature erosion and cracking of the fuel injector in service. In some examples, the exposure of the fuel injector to hot combustion gases may result in erosion of a tip of the fuel injector. Further, an oxidation of the flared portion of the seal due to insufficient cooling may also increase emission levels of the combustion chamber. In some examples, oxidation of the seal may result in a change in a flame position, which may in turn expose a heatshield of the combustor arrangement to hot combustion gases.

In some examples, the cooling fluid exiting the seal may mix with the fuel and air mixture delivered by the fuel injector. In some examples, the cooling fluid may adversely affect the fuel and air mixture supplied by the fuel injector, which may in turn affect a combustion of the fuel and air mixture in the combustion chamber. For example, the cooling fluid may cause an undesirable increase in emission levels of the combustion chamber.

SUMMARY

In a first aspect, there is provided a combustor arrangement. The combustor arrangement includes a fuel injector. The combustor arrangement also includes a seal arranged around the fuel injector and having an upstream end and a downstream end. The seal includes an annular body at least partially abutting the fuel injector. The annular body extends circumferentially about a central axis and axially extends along the central axis from the upstream end to the downstream end. The annular body includes an inner surface facing the fuel injector. The inner surface axially extends from the upstream end to the downstream end. The annular body also includes an outer surface radially spaced apart from the inner surface relative to the central axis and facing away from the fuel injector. The outer surface axially extends from the upstream end to the downstream end. The annular body further includes a plurality of slots disposed on the inner surface and circumferentially spaced apart from each other relative to the central axis. Each slot axially extends at least partially from the downstream end to the upstream end. Each slot is disposed in fluid contact across its maximum length with the fuel injector. The seal also includes a flange radially extending from the outer surface of the annular body at the upstream end.

The seal associated with the combustor arrangement may include a flare-less design having the plurality of slots. The slots associated with the seal may be embodied as substantially full-length slots. Further, a cooling fluid flowing through the substantially full-length slots may allow cooling of the seal and the fuel injector. Moreover, the spent cooling fluid may be then delivered locally to a fuel spray cone of the fuel injector which may in turn provide a benefit to engine emissions in terms of smoke. The seal described herein may provide improved cooling of the seal and the fuel injector. Further, the seal may reduce smoke emissions, thereby addressing issues associated with seal durability and engine emission certifications. The slots are disposed on the inner surface of the seal which may enable high levels of convective heat transfer to take place along a length of the seal and may provide a means to effectively cool hot portions of the seal. Further, the cooling fluid flowing through the slots may also enhance heat transfer at an outer diameter of the fuel injector. Moreover, a placement of the slots on the inner surface may also generate a radial positive pressure at an interface between the seal and the outer diameter of the fuel injector, which may in turn drive the cooling fluid by pressure. This feature may also improve durability of the seal which may prevent rapid oxidisation of the seal. In some examples, a pressure differential across the seal may create an aerodynamic bearing, which may reduce contact load and operational wear of the seal and/or the fuel injector.

Moreover, as mentioned above, the design of the seal described herein may address engine emission issues by realising an interaction of the cooling fluid with a fuel spray cone. Specifically, the cooling fluid may exit the slots in close proximity to the fuel injector which may allow control over a fuel spray cone angle. For example, by introducing the cooling fluid locally to the fuel spray cone, the fuel spray cone angle may be narrowed, which may in turn reduce a residence time of combustion processes in a primary zone (i.e., a front section of a combustion chamber). The primary zone may be primarily responsible for production of smoke emissions. Further, the seal described herein may be compact and lightweight. Furthermore, the seal may be manufactured via a range of processes, such as, casting, electrical discharge machining (EDM), grinding, additive layer manufacturing (ALM), broaching etc., providing supply chain flexibility. Moreover, the seal may be retrofitted in existing combustor arrangements without any changes to the combustor arrangement.

In some embodiments, each slot extends along a slot axis. The slot axis of each slot is parallel to or circumferentially angled relative to the central axis by an oblique angle. When the slot axis of each slot is circumferentially angled relative to the central axis, the slots may include an increased length which may in turn increase convective heat transfer between the cooling fluid and one or more portions of the seal and/or the fuel injector. Moreover, this feature may also be used to control an interaction of the spent cooling fluid with the fuel spray cone, i.e., co-swirling for reduced interaction and counter swirling for maximum interaction.

In some embodiments, an angular width of each slot with respect to the central axis is uniform or variable along the slot axis.

In some embodiments, the angular width of each slot progressively increases or decreases from the upstream end to the downstream end. More particularly, in some cases, the slot may have a converging cross-section that may accelerate a flow of the cooling fluid at an exit of the seal. Such a feature may ensure increased heat transfer in high temperature regions of the seal and/or the fuel injector.

In some embodiments, each slot has a maximum radial height along a radial direction with respect to the central axis. The maximum radial height of each slot is at most 90% of a maximum radial thickness of the annular body from the inner surface to the outer surface.

In some embodiments, each slot has a maximum angular width along a circumferential direction with respect to the central axis. The maximum angular width is equal to or different from the maximum radial height.

In some embodiments, the maximum angular width is greater than the maximum radial height by a factor of less than or equal to 90.

In some embodiments, the maximum angular width is less than the maximum radial height.

In some embodiments, each slot has a maximum slot length along the central axis. The maximum slot length of each slot is at least 90% of a maximum axial length of the annular body from the upstream end to the downstream end. Accordingly, the slots extending axially along a major portion of the maximum axial length may allow increase in a rate of heat transfer between the cooling fluid and one or more portions of the seal or the fuel injector.

In some embodiments, the maximum slot length of each slot is less than the maximum axial length of the annular body.

In some embodiments, the maximum slot length of each slot is substantially equal to the maximum axial length of the annular body. This feature may allow increase in a rate of heat transfer between the cooling fluid and one or more portions of the seal or the fuel injector.

In some embodiments, each slot extends from an upstream slot end proximal to the upstream end of the seal to a downstream slot end disposed at the downstream end of the seal. The upstream slot end is axially spaced apart from the upstream end of the seal with respect to the central axis.

In some embodiments, the inner surface at least partially contacts the fuel injector. Each slot radially extends from the inner surface partially towards the outer surface.

In some embodiments, the annular body further includes a plurality of slot walls. Each slot wall defines a corresponding slot from the plurality of slots. The slot wall includes at least one of a plurality of recesses and a plurality of projections. The recesses and/or the projections may increase a rate of heat transfer between the cooling fluid and one or more portions of the seal.

In some embodiments, the annular body further includes a plurality of wall portions extending from the inner surface and circumferentially spaced apart from each other relative to the central axis. Each wall portion at least partially contacts the fuel injector. Each slot is defined by the inner surface and a pair of corresponding adjacent wall portions from the plurality of wall portions.

In some embodiments, each slot has a maximum angular extent relative to the central axis. The maximum angular extent is less than 120 degrees.

In some embodiments, the plurality of slots includes at least three slots.

In some embodiments, each slot has a cross-sectional shape that is at least one of semi-circular, rectangular, concave, square, and trapezoidal. In some examples, the cross-sectional shape may include a curved portion to aid in manufacturing of the seal and reduce contact wear from sharp edges. Moreover, the cross-sectional shape may include a high aspect ratio which may increase heat transfer areas within the slots.

In some embodiments, the outer surface of the annular body has a substantially uniform outer diameter along the central axis. Thus, the seal described herein may eliminate a flared portion associated with conventional seals thereby reducing a complexity of manufacturing the seal. Moreover, an absence of the flared portion may reduce a possibility of material accumulation at an exit of the slots due to oxidation and/or melting of the flared portion as in conventional seals.

In some embodiments, the combustor arrangement further includes a meter panel having a cold side and a hot side. The meter panel has an aperture extending through the meter panel between the hot and cold sides. The seal is sized to fit through the aperture of the meter panel, such that the upstream end of the seal is proximal to the cold side of the meter panel and the downstream end of the seal is proximal to the hot side of the meter panel. Each slot is configured to receive the cooling fluid at the upstream end of the seal and discharge the cooling fluid at the downstream end of the seal, such that the cooling fluid contacts the fuel injector while flowing through each slot In a second aspect, there is provided a gas turbine engine comprising the combustor arrangement of the first aspect.

The present disclosure may generally relate to seals associated with the combustor arrangement of gas turbine engines.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example, via a spur shaft and/or gear. The core shaft may rigidly connect the turbine and the compressor, such that the turbine and the compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example, one, two, or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and the second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example, the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and the second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and the second turbine as described above) may comprise any number of stages, for example, multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e., the values may form upper or lower bounds), for example, in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e., the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches), or 420 cm (around 165 inches). The fan diameter may be in an inclusive range bounded by any two of the values in the previous sentence (i.e., the values may form upper or lower bounds), for example, in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example, less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, or for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, or for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example, at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39, or 0.4 (all units in this paragraph being $Jkg^{-1} K^{-1}/(ms^{-1})^2$). The fan tip loading may be in an inclusive range bounded by any two of the values in the previous sentence (i.e., the values may form upper or lower bounds), for example, in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5, or 20. The bypass ratio may be in an inclusive range bounded by any two of the values in the previous sentence (i.e., the values may form upper or lower bounds), for example, in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, or 75. The overall pressure ratio may be in an inclusive range bounded by any two of the values in the previous sentence (i.e., the values may form upper or lower bounds), for example, in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s, or 80 $Nkg^{-1}$ s. The specific thrust may be in an inclusive range bounded by any two of the values in the previous sentence (i.e., the values may form upper or lower bounds), for example, in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 KN, 180 KN, 190 KN, 200 KN, 250 kN, 300 kN, 350 kN, 400 KN, 450 KN, 500 kN, or 550 kN. The maximum thrust may be in an inclusive range bounded by any two of the values in the previous sentence (i.e., the values may form upper or lower bounds). Purely by way of example, a gas turbine as described and/or claimed herein may be capable of producing a maximum thrust in the range of from 330 kN to 420 kN, for example, 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high-pressure turbine may be particularly high. This temperature, which may be referred to as TET, may be measured at the exit to the combustor, for example, immediately upstream of the first turbine vane, which itself may be referred to as a nozzle guide vane. At cruise, the TET may be at least (or on the order of) any of the following: 1400K. 1450K, 1500K, 1550K. 1600K, or 1650K. The TET at cruise may be in an inclusive range bounded by any two of the values in the previous sentence (i.e., the values may form upper or lower bounds). The maximum TET in use of the engine may be, for example, at least (or on the order of) any of the following: 1700K. 1750K, 1800K, 1850K, 1900K, 1950K, or 2000K. The maximum TET may be in an inclusive range bounded by any two of the values in the previous sentence (i.e., the values may form upper or lower bounds), for example, in the range of from 1800K to 1950K. The maximum TET may occur, for example, at a high thrust condition, or for example, at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example, a metal matrix composite and/or an organic matrix composite, such as carbon fibre. By way of further example, at least a part of the fan blade and/or aerofoil may be manufactured at least in part from a metal, such as, a titanium-based metal or an aluminium based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice, or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example, in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example, 14, 16, 18, 20, 22, 24, or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e., maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85, or in the range of from 0.8 to 0.85. Any single speed within these ranges may be part of the cruise condition. For some aircraft, the cruise conditions may be outside these ranges, for example, below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, or for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions, and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying Figures. Further aspects and embodiments will be apparent to those skilled in the art.

Figure 1:
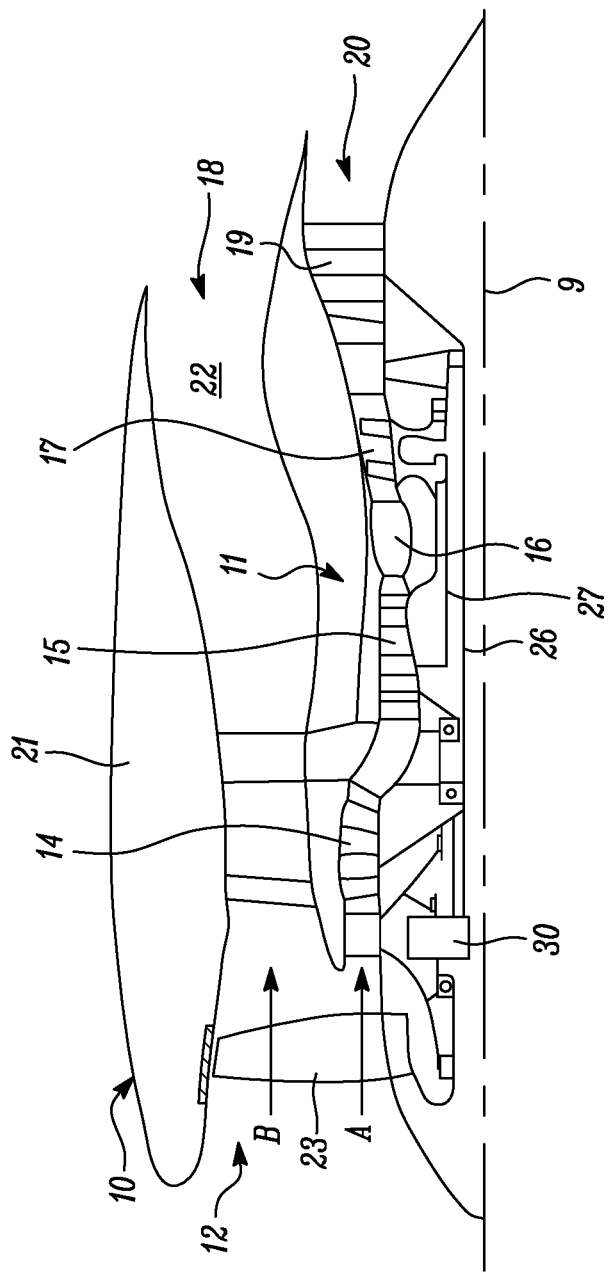
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, a combustion equipment 16, a high-pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
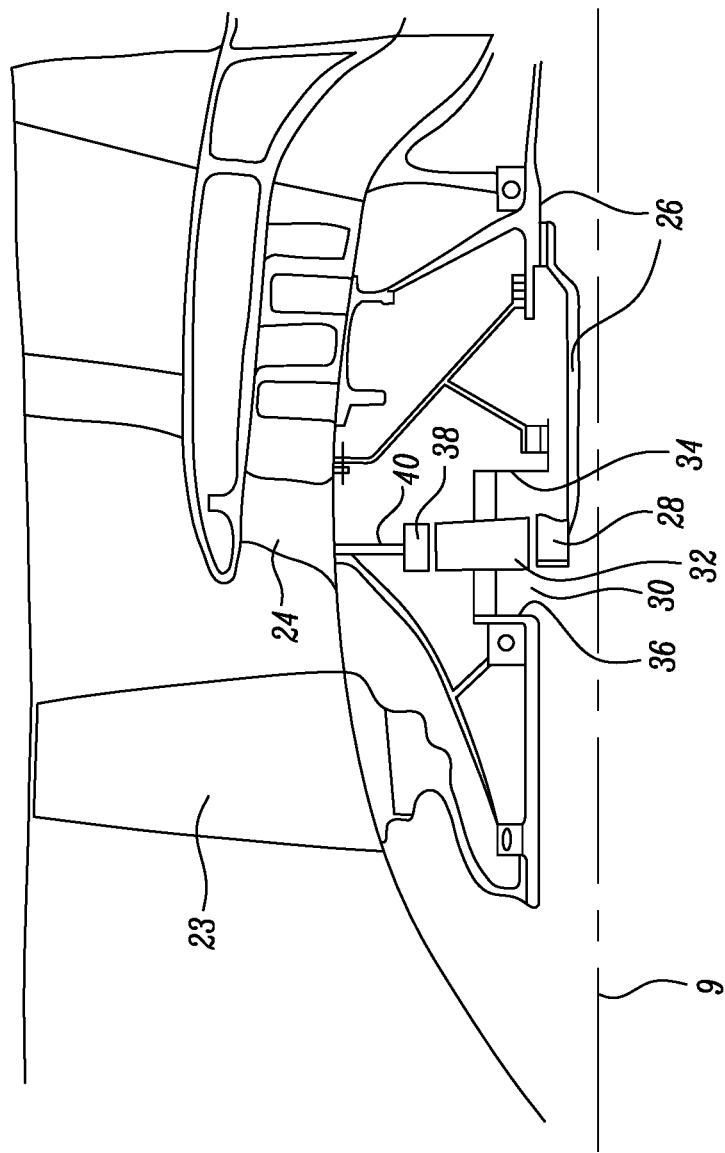
FIG. 2 is a close-up sectional side view of an upstream portion of the gas turbine engine of FIG. 1.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the rotational axis 9. Radially outwardly of the planet gears 32 and intermeshing therewith is an annulus or ring gear 38 that is coupled, via linkages 40, to a stationary supporting structure 24.

Note that the terms "low pressure turbine" and "low-pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine 10 (i.e., not including the gearbox output shaft that drives the fan 23). In some literature, the "low pressure turbine" and "low-pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
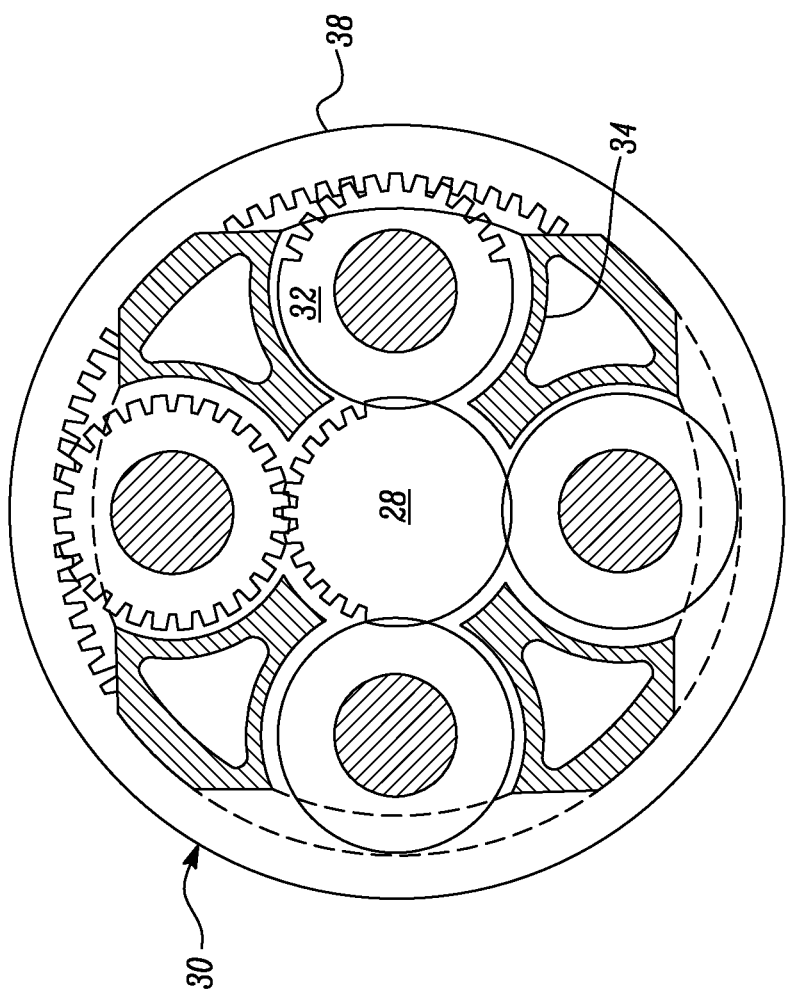
FIG. 3 is a partially cut-away view of a gearbox for the gas turbine engine of FIG. 1.

The epicyclic gearbox 30 is shown by way of example in greater detail in FIG. 3. Each of the sun gear 28, the planet gears 32, and the ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36. with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement, the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine 10 (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangements, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as, an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial, and circumferential directions are mutually perpendicular.

In addition, the present invention is equally applicable to aero gas turbine engines, marine gas turbine engines, and land-based gas turbine engines.

Figure 4:
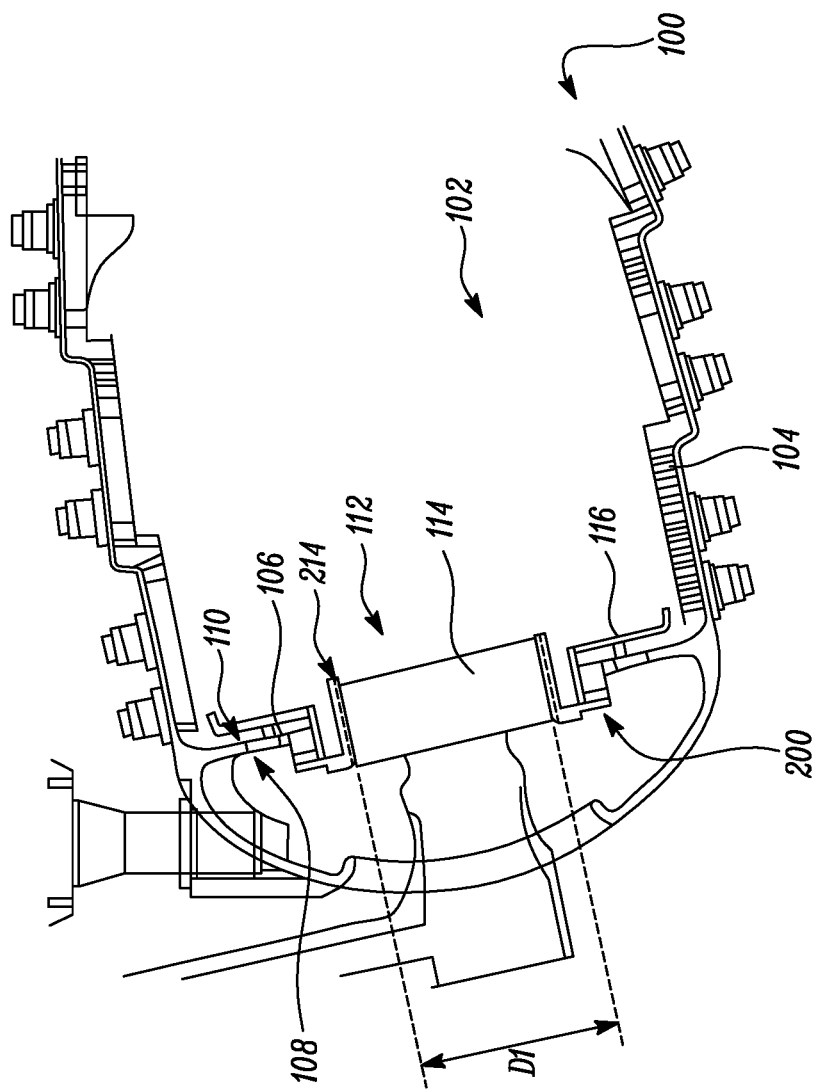
FIG. 4 is a sectional side view of a combustor arrangement associated with the gas turbine engine of FIG. 1 according to an embodiment of the present disclosure.

FIG. 4 illustrates an exemplary embodiment of a combustor arrangement 100 associated with the gas turbine engine 10 of FIG. 1. The combustor arrangement 100 defines a combustion chamber 102. Specifically, the combustion chamber 102 is defined by a combustor wall 104 and an annular meter panel 106.

The combustor arrangement 100 includes the meter panel 106 having a cold side 108 and a hot side 110. The meter panel 106 is disposed proximate to the high-pressure compressor 15 (see FIG. 1). The meter panel 106 has an aperture 112 extending through the meter panel 106 between the hot and cold sides 108, 110. The upstream cold side 108 faces the high-pressure compressor 15 and the downstream hot side 110 faces the combustion chamber 102. An annular location ring (not shown) may be coupled at an inside of the aperture 112 in the meter panel 106 for locating a seal 200 and a fuel injector 114. It should be noted that the meter panel 106 may include a number of apertures 112, such that each aperture 112 may receive a corresponding location ring, a corresponding seal 200, and a corresponding fuel injector 114 therethrough. The meter panel 106 may include at least one retaining feature (not shown) at its cold side 108 and at least one slot (not shown) that extends through the meter panel 106 from the cold side 108 to the hot side 110 and is open to the aperture 112. The combustor arrangement 100 further includes a heatshield 116 provided on the hot side 110 of the meter panel 106.

Figure 5:
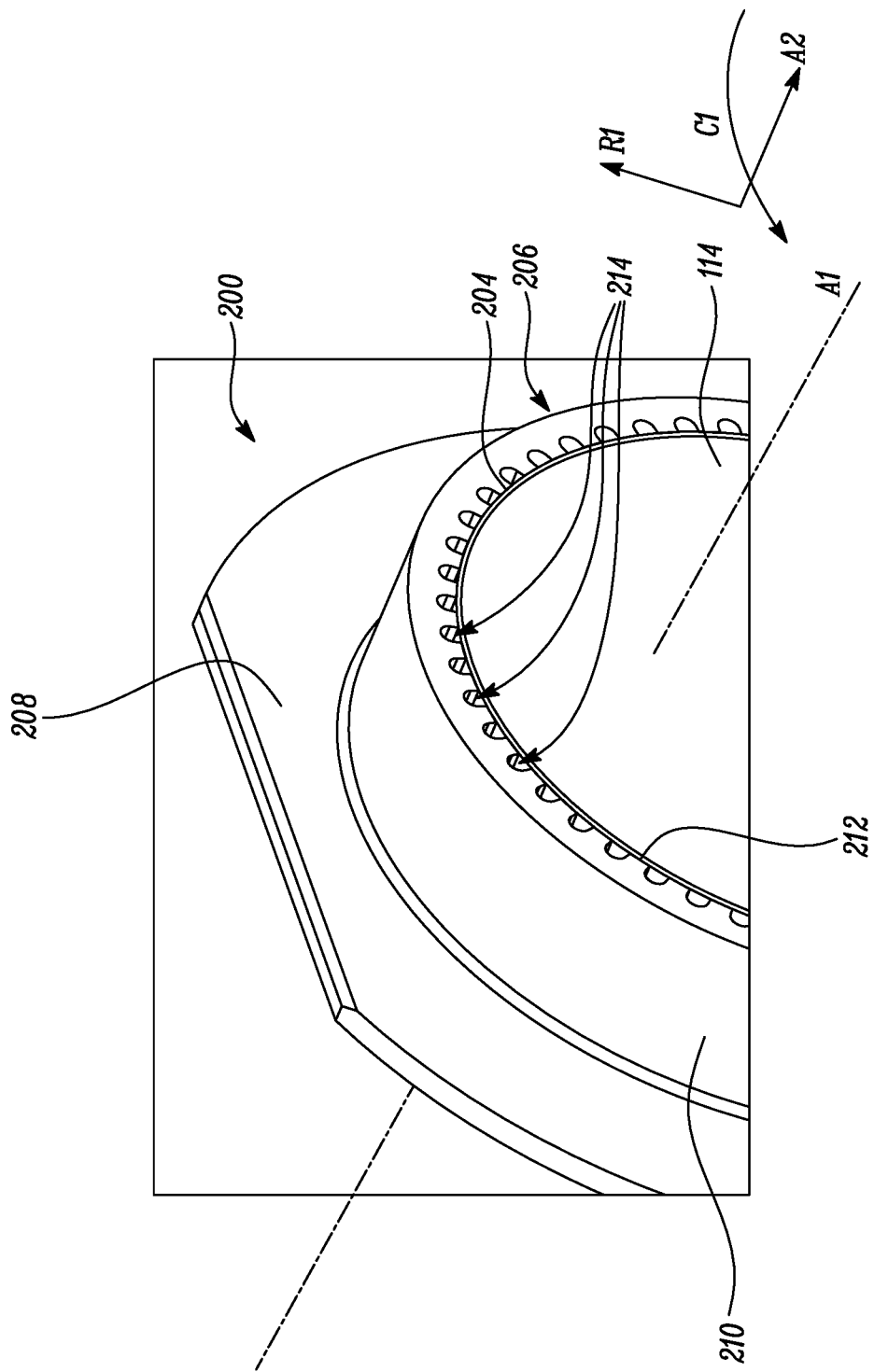
FIG. 5 illustrates a partial perspective view of a seal and a fuel injector associated with the combustor arrangement of FIG. 4 according to an embodiment of the present disclosure.

Further, the combustor arrangement 100 includes the fuel injector 114. The fuel injector 114 is arranged to supply fuel into the combustion chamber 102 during operation of the gas turbine engine 10. The fuel injector 114 defines an outer diameter D1. As shown in FIG. 5, the combustor arrangement 100 also includes the seal 200 arranged around the fuel injector 114 and having an upstream end 202 (shown in FIG. 6) and a downstream end 204. The seal 200 is sized to fit through the aperture 112 (see FIG. 4) of the meter panel 106 (see FIG. 4), such that the upstream end 202 of the seal 200 is proximal to the cold side 108 (see FIG. 4) of the meter panel 106 and the downstream end 204 of the seal 200 is proximal to the hot side 110 (see FIG. 4) of the meter panel 106. The seal 200 may be mounted from the cold side 108 of the meter panel 106. Further, the fuel injector 114 may be mounted through the seal 200 from the cold side 108 of the meter panel 106.

Figure 6:
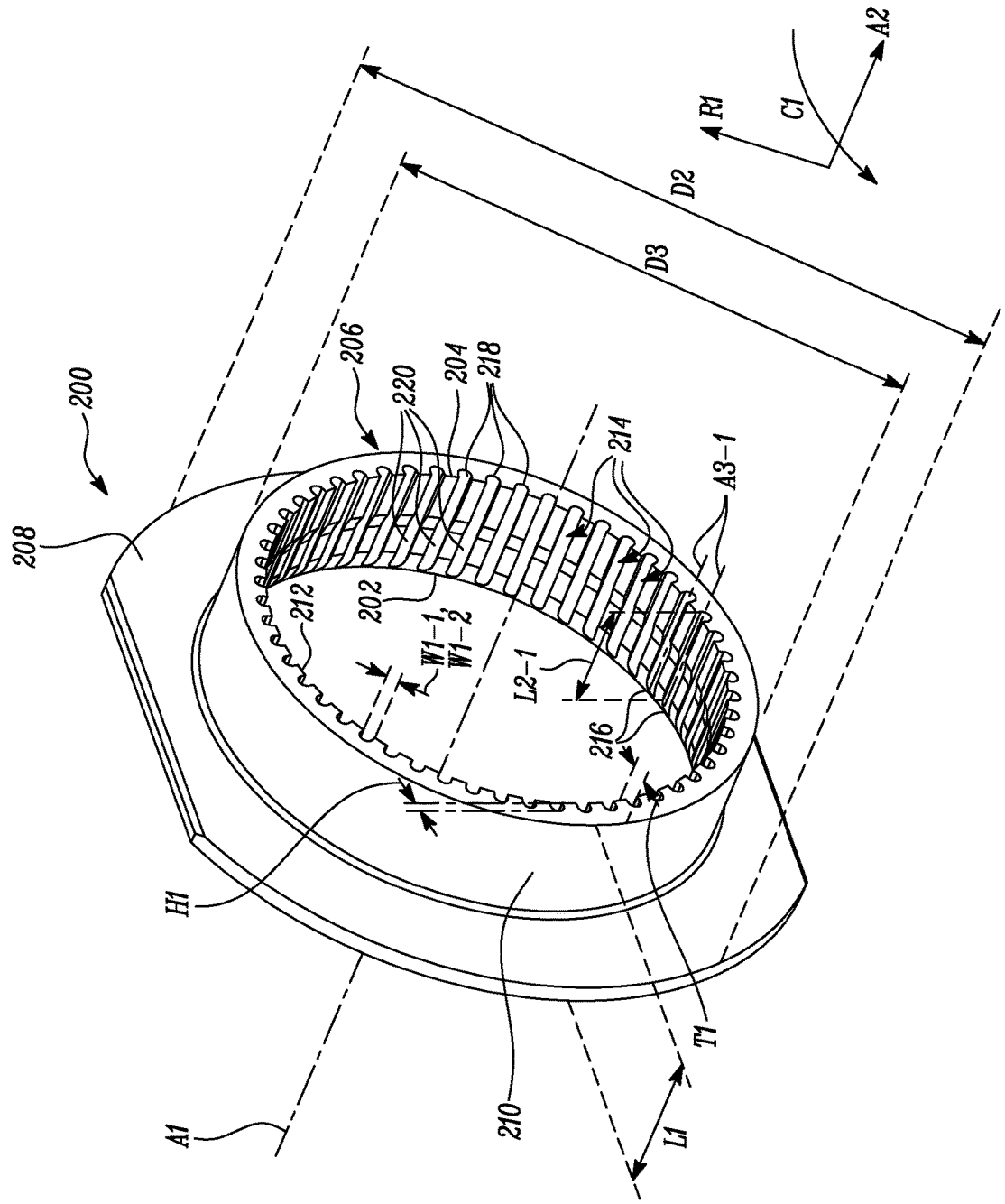
FIG. 6 illustrates a perspective view of the seal of FIG. 5 according to an embodiment of the present disclosure.

As shown in FIG. 6, the seal 200 defines a central axis A1 extending along an axial direction A2. Further, the seal 200 includes a generally annular shape. The seal 200 includes an annular body 206 at least partially abutting the fuel injector 114 (see FIG. 5). The seal 200 further includes a flange 208 radially extending from an outer surface 210 of the annular body 206 at the upstream end 202. The flange 208 defines a diameter D2. The seal 200 may include a pair of tangs (not shown) extending axially from the flange 208 proximal to the upstream end 202 of the seal 200. The pair of tangs may be arranged diametrically opposite to each other. Each tang may be sized to pass through a corresponding slot in the meter panel 106 (see FIG. 4). It should be noted that the meter panel 106 has the same number and distribution of slots as the seal 200 has the tangs.

The annular body 206 extends circumferentially about the central axis A1 and extends axially along the central axis A1 from the upstream end 202 to the downstream end 204. The annular body 206 defines a maximum axial length L1 from the upstream end 202 to the downstream end 204. Further, the annular body 206 includes an inner surface 212 facing the fuel injector 114. The inner surface 212 axially extends from the upstream end 202 to the downstream end 204. The inner surface 212 at least partially contacts the fuel injector 114. In some examples, the inner surface 212 may abut with the fuel injector 114.

Further, the annular body 206 includes the outer surface 210 radially spaced apart from the inner surface 212 relative to the central axis A1 and facing away from the fuel injector 114. The outer surface 210 axially extends from the upstream end 202 to the downstream end 204. Further, in the illustrated example of FIG. 6, the outer surface 210 of the annular body 206 has a substantially uniform outer diameter D3 along the central axis A1. Specifically, the seal 200 described herein may not include a flared portion at the downstream end 204 thereof. Further, the diameter D2 of the flange 208 may be greater than the outer diameter D3 defined by the outer surface 210 of the annular body 206.

Moreover, the annular body 206 defines a maximum radial thickness T1 from the inner surface 212 to the outer surface 210.

As illustrated in FIG. 6, the annular body 206 includes a plurality of slots 214 disposed on the inner surface 212 and circumferentially spaced apart from each other relative to the central axis A1. Each slot 214 axially extends at least partially from the downstream end 204 to the upstream end 202. Further, each slot 214 is disposed in fluid contact with the fuel injector 114. Moreover, each slot 214 is configured to receive a cooling fluid at the upstream end 202 of the seal 200 and discharge the cooling fluid at the downstream end 204 of the seal 200, such that the cooling fluid contacts the fuel injector 114 while flowing through each slot 214. In some examples, the plurality of slots 214 may include at least three slots 214. The slots 214 may be equally spaced apart from each other along a circumferential direction C1.

Figure 7:
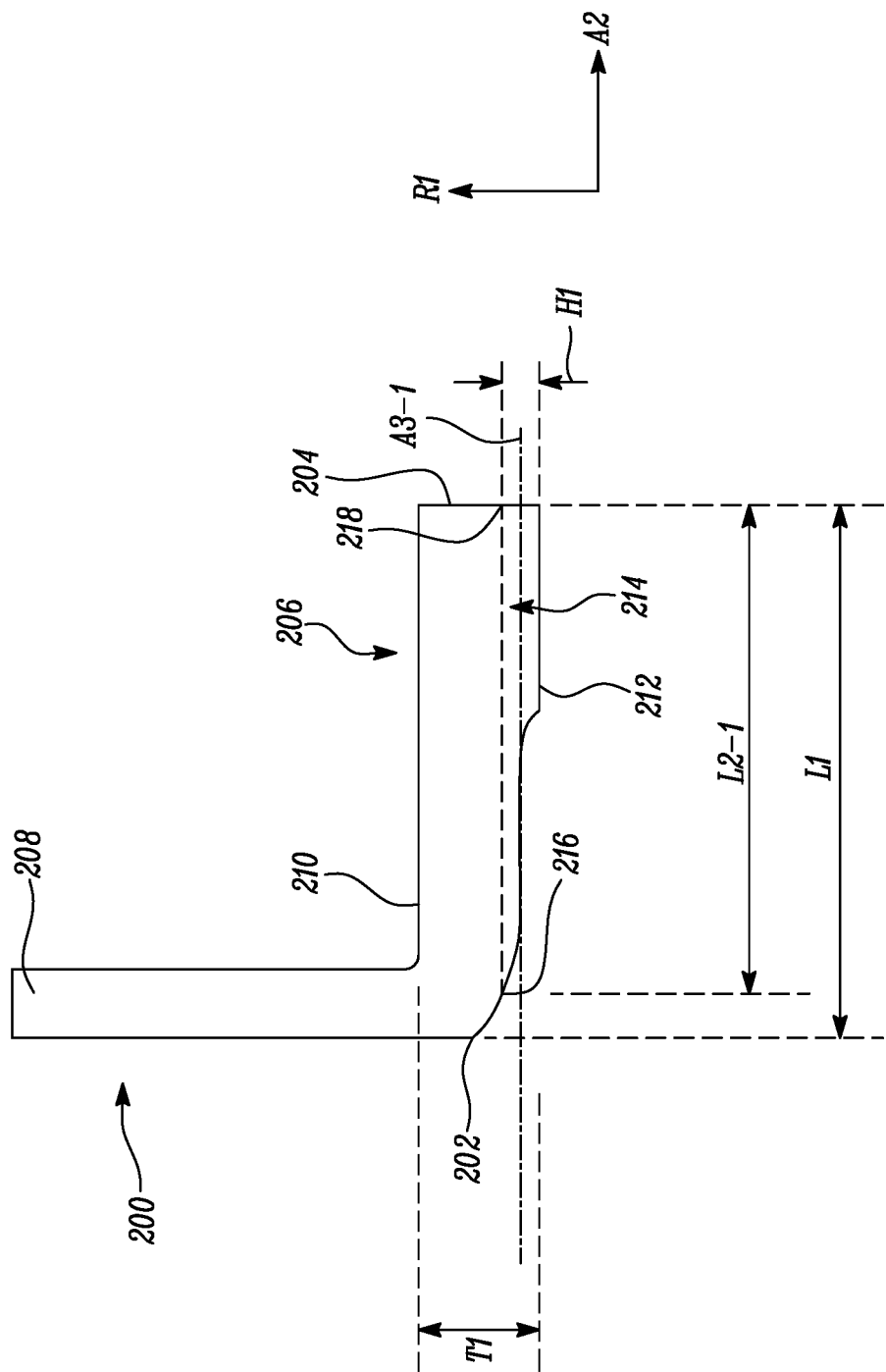
FIG. 7 is a schematic side view of a portion of the seal of FIG. 6 according to an embodiment of the present disclosure.

As illustrated in FIG. 7, each slot 214 radially extends from the inner surface 212 partially towards the outer surface 210. Specifically, each slot 214 has a maximum radial height H1 along a radial direction R1 with respect to the central axis A1. In the illustrated example of FIG. 7, the maximum radial height H1 is defined proximate to a downstream slot end 218 of the slot 214. Further, the maximum radial height H1 of each slot 214 may be at most 90% of the maximum radial thickness T1 of the annular body 206 from the inner surface 212 to the outer surface 210. In various examples, the maximum radial height H1 of each slot 214 may be at most 75%, 50%, 25%, and the like, of the maximum radial thickness T1.

Figure 8:
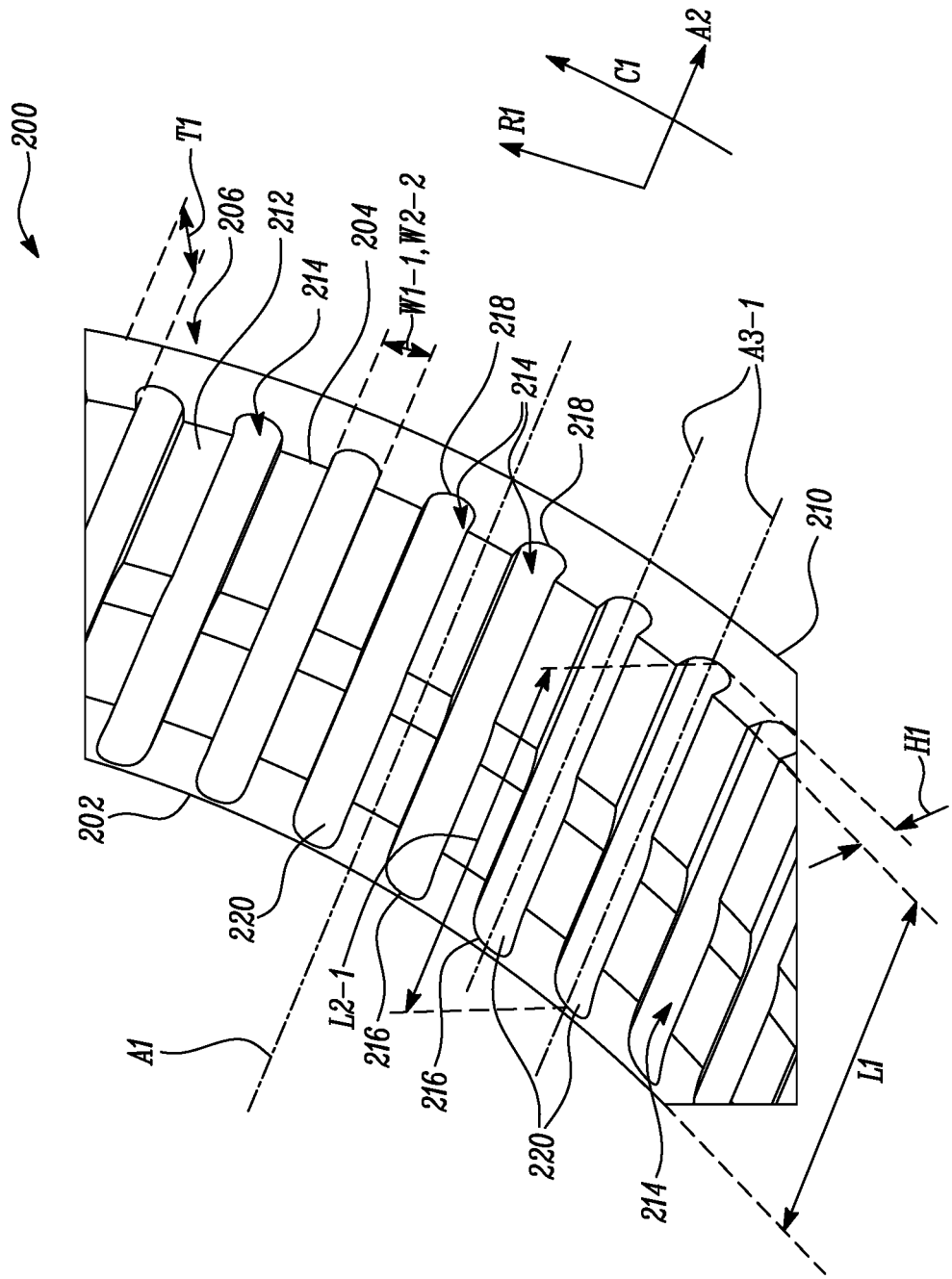
FIG. 8 illustrates a perspective view of a portion of the seal of FIG. 6 according to an embodiment of the present disclosure.

Referring now to FIG. 8, each slot 214 extends from an upstream slot end 216 proximal to the upstream end 202 of the seal 200 to the downstream slot end 218 disposed at the downstream end 204 of the seal 200. The upstream slot end 216 is axially spaced apart from the upstream end 202 of the seal 200 with respect to the central axis A1. The upstream slot end 216 includes a rounded design herein. In other examples, the upstream slot end 216 may be disposed at the upstream end 202 of the seal 200. The downstream end 204 is open to allow discharge of the cooling fluid from the corresponding slot 214.

Moreover, each slot 214 has a maximum slot length L2-1 along the central axis A1. The maximum slot length L2-1 of each slot 214 may be at least 90% of the maximum axial length L1 of the annular body 206 from the upstream end 202 to the downstream end 204. In various examples, the maximum slot length L2-1 of each slot 214 may be at least 92%, 95%, 97%, 99%, and the like, of the maximum axial length L1. In the illustrated example of FIG. 8, the maximum slot length L2-1 of each slot 214 may be less than the maximum axial length L1 of the annular body 206. Specifically, as the upstream slot end 216 may be axially spaced apart from the upstream end 202 of the seal 200 with respect to the central axis A1, the maximum slot length L2-1 may be less than the maximum axial length L1. Alternatively, the maximum slot length L2-1 of each slot 214 may be substantially equal to the maximum axial length L1 of the annular body 206. Specifically, in examples wherein the upstream slot end 216 may be disposed at the upstream end 202 of the seal 200, the maximum slot length L2-1 may be substantially equal to the maximum axial length L1.

Further, each slot 214 defines an angular width W1-1. It should be noted that the angular width W1-1 may vary at different portions of the slot 214 along the central axis A1. Thus, each slot 214 has a maximum angular width W1-2 along the circumferential direction C1 with respect to the central axis A1. The maximum angular width W1-2 may be defined at a portion of the slot 214 having a highest value of the maximum angular width W1-1. In the illustrated example of FIG. 8, the angular width W1-1 may be substantially similar to the maximum angular width W1-2. Further, in some examples, the maximum angular width W1-2 of the slots 214 may be based on a total number of the slots 214 and the outer diameter D3 (see FIG. 6). In some exemplary embodiments, the maximum angular width W1-2 may be from about 0.5 mm to about 4 mm. The maximum angular width W1-2 may be equal to or different from the maximum radial height H1. In an example, the maximum angular width W1-2 may be greater than the maximum radial height H1 by a factor of less than or equal to 90. In another example, the maximum angular width W1-2 may be less than the maximum radial height H1. In some examples, a circumferential spacing between adjacent slots 214 may not be less than the maximum angular width W1-2 of the slots 214. In other words, a circumferential spacing between adjacent slots 214 may be greater than or equal to the maximum angular width W1-2 of the slots 214.

Figures 9A, 9B:
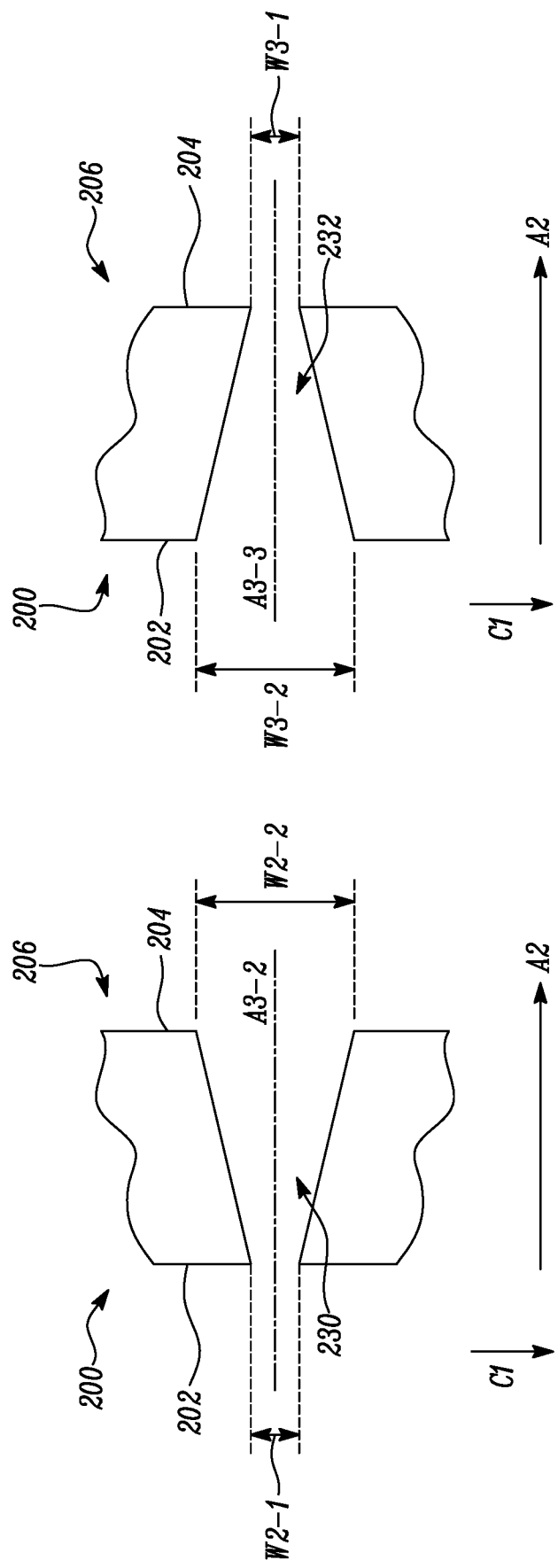
FIG. 9A is a schematic view illustrating a slot associated with the seal of FIG. 6 wherein an angular width of the slot progressively increases from an upstream end of the seal to a downstream end of the seal according to an embodiment of the present disclosure.
FIG. 9B is a schematic view illustrating a slot associated with the seal of FIG. 6 wherein an angular width of the slot progressively decreases from the upstream end of the seal to the downstream end of the seal according to an embodiment of the present disclosure

Each slot 214 defines a slot axis A3-1 along the maximum slot length L2-1. Therefore, each slot 214 extends along the corresponding slot axis A3-1. In some examples, the angular width W1-1 of each slot 214 with respect to the central axis A1 may be uniform or variable along the slot axis A3-1. As shown in FIG. 8, the angular width W1-1 of each slot 214 with respect to the central axis A1 may be uniform along the slot axis A3-1. Alternatively, as shown in FIGS. 9A and 9B, an angular width W2-1, W3-1 of each slot 230, 232 (shown in FIGS. 9A and 9B, respectively) with respect to the central axis A1 (see FIG. 6) may be variable along a slot axis A3-2, A3-3 (shown in FIGS. 9A and 9*b*, respectively). Further, the angular width W2-1. W3-1 (shown in FIGS. 9A and 9*b*, respectively) of each slot 230, 232 may progressively increase or decrease from the upstream end 202 to the downstream end 204. Specifically, the angular width W2-1 of the slot 230 varies along the corresponding slot axis A3-2. Further, the angular width W3-1 of the slot 232 varies along the corresponding slot axis A3-3. The slots 230, 232 including the progressively increasing or decreasing annular widths W2-1. W3-1, respectively, may allow a variation in the flow of the cooling fluid through the slots 230, 232.

As shown in FIG. 9A, the angular width W2-1 of each slot 230 may progressively increase from the upstream end 202 to the downstream end 204 such that the slot 230 may include a diverging cross-section. Further, the slot 230 has a maximum angular width W2-2 at the downstream end 204. The maximum angular width W2-2 may be equal to or different from the maximum radial height H1 (see FIG. 6). In another example, as shown in FIG. 9B, the angular width W3-1 of each slot 232 may progressively decrease from the upstream end 202 to the downstream end 204 such that the slot 232 may include a converging cross-section. For example, the slots 232 including the progressively increasing annular width W3-1 may accelerate the flow through the slots 232 to ensure maximum heat transfer in high temperature regions. Further, the slot 232 has a maximum angular width W3-2 at or proximal to the upstream end 202. The maximum angular width W3-2 may be equal to or different from the maximum radial height H1 (see FIG. 6).

Figure 10B:
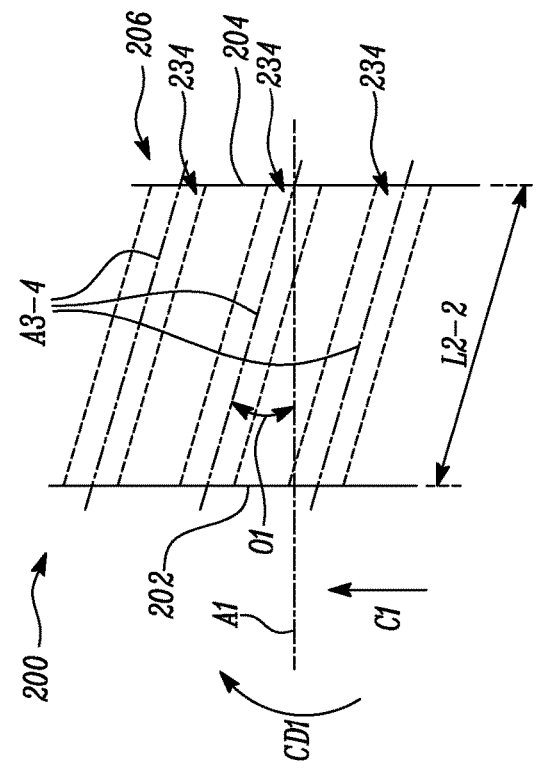
FIGS. 10A, 10B, and 10C illustrate respective schematic views of different longitudinal configurations of the slots of the seal of FIG. 6 according to various embodiments of the present disclosure.
Figure 10C:
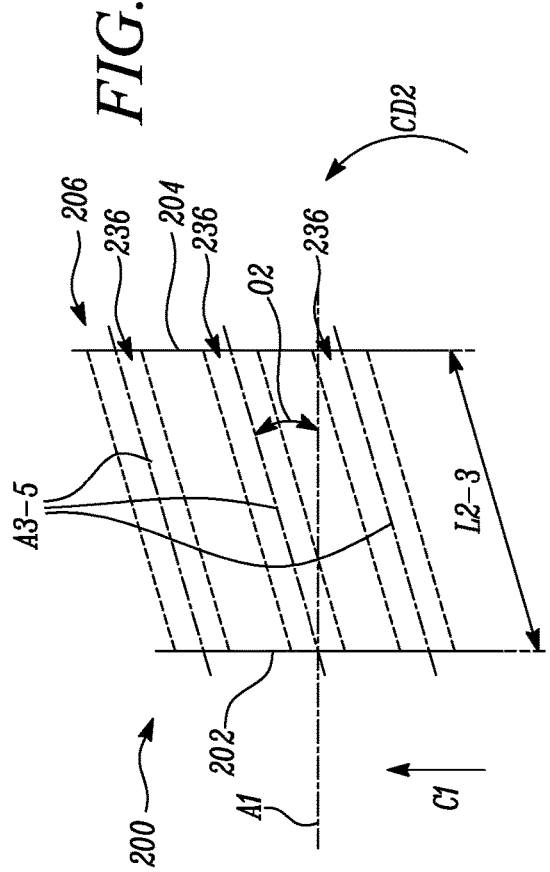
Figure 10A:
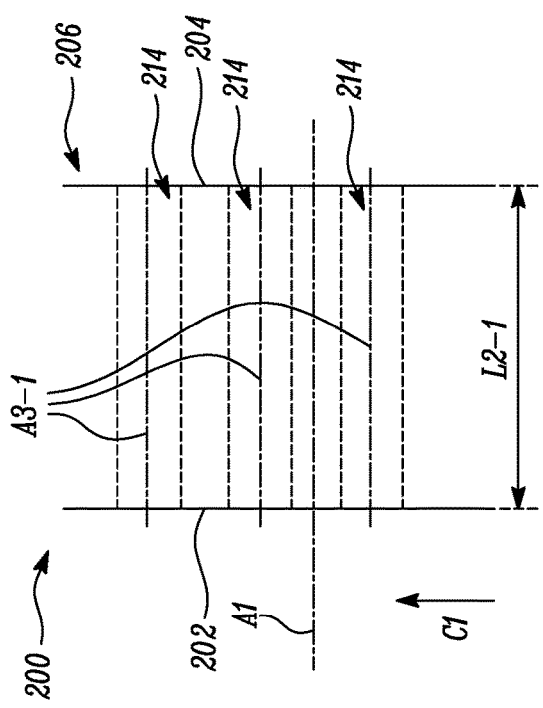

Referring to FIG. 10A, each slot 214 may extend along the slot axis A3-1. The slot axis A3-1 of each slot 214 may be parallel to or circumferentially angled relative to the central axis A1 by an oblique angle. As illustrated in FIG. 10A, the slot axis A3-1 of each slot 214 may be parallel to the central axis A1. Referring to FIGS. 10B and 10C, each slot 234, 236 (shown in FIGS. 10B and 10C, respectively)

may extend along slot axes A3-4, A3-5 (shown in FIGS. 10B and 10C, respectively). Further, as illustrated in FIGS. 10B and 10C, the slot axis A3-4, A3-5 of each slot 234, 236 may be circumferentially angled relative to the central axis A1 by an oblique angle O1, O2 (shown in FIGS. 10B and 10C, respectively). More specifically, in some examples, each slot 234 may be circumferentially angled relative to the central axis A1 by the oblique angle O1. Further, each slot 236 may be circumferentially angled relative to the central axis A1 by the oblique angle O2. Furthermore, each of the slots 234, 236 may be obliquely inclined relative to the circumferential direction C1. Such slots 234, 236 may increase corresponding maximum slot lengths L2-2, L2-3 of the corresponding slots 234, 236, which may in turn improve a rate of convective heat transfer. Specifically, the maximum slot length L2-2 of each slot 234 may be greater than the maximum slot length L2-1 of each slot 214 (shown in FIG. 10A). Similarly, the maximum slot length L2-3 of each slot 236 may be greater than the maximum slot length L2-1 of each slot 214. Further, the circumferentially angled slots 234, 236 may allow control of an interaction between the cooling fluid flowing through the corresponding slots 234, 236 and a fuel spray cone, i.e., co-swirling for reduced interaction and/or counter swirling for maximum interaction. In some examples, the oblique angle O1, O2 may be from about 30 degrees to about 75 degrees. In an example, the oblique angle O1, O2 may be substantially equal to 60 degrees.

In an example, as illustrated in FIG. 10B, the slots 234 may be circumferentially angled such that the oblique angle O1 defined between the central axis A1 and the slot axis A3-4 may be measured in a clockwise direction CD1. In another example, as illustrated in FIG. 10C, the slots 236 may be circumferentially angled such that the oblique angle O2 defined between the central axis A1 and the slot axis A3-5 may be measured in a counter-clockwise direction CD2.

As shown in FIG. 8, the annular body 206 further includes a plurality of slot walls 220. Each slot wall 220 defines a corresponding slot 214 from the plurality of slots 214. As shown in FIGS. 11A, 11B, 11C, and 11D, the slot wall 220 includes at least one of a plurality of recesses 222 (shown in FIG. 11A) and a plurality of projections 224, 226, 228 (shown in FIGS. 11B, 11C, and 11D, respectively). The plurality of recesses 222 and the plurality of projections 224, 226, 228 may increase a rate of heat transfer based on an increase in a surface area defined by the slots 214. In some examples, the slot wall 220 may include the plurality of recesses 222 or the plurality of projections 224, 226, 228. Alternatively, the slot wall 220 may include a combination of the plurality of recesses 222 and the plurality of projections 224, 226, 228, without any limitations.

Figure 11B:
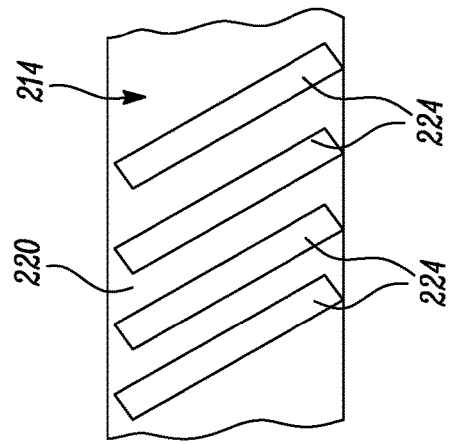
FIGS. 11B to 11D are respective schematic views illustrating slots having different types of projections according to various embodiments of the present disclosure.
Figure 11D:
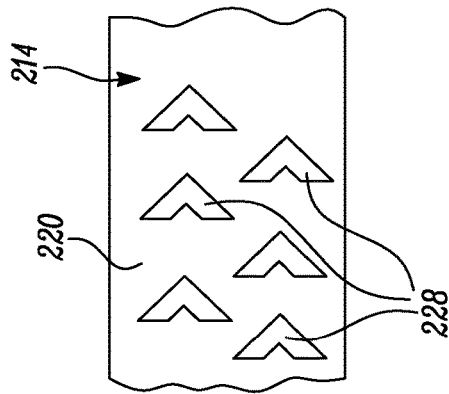
Figure 11A:
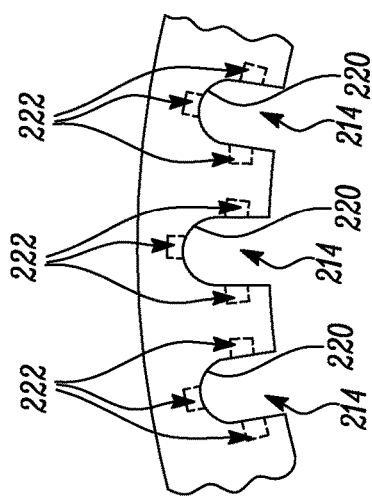
FIG. 11A is a schematic view illustrating a slot having a number of recesses according to an embodiment of the present disclosure.
Figure 11C:
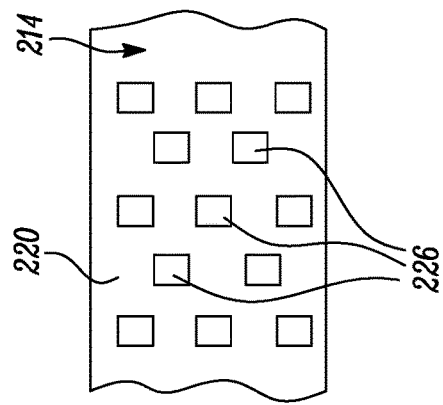

Referring to FIG. 11A, the slot wall 220 may include the plurality of recesses 222. The recesses 222 in the slot wall 220 may have a rectangular shape, a circular shape, an arrow shape, a circular shape, a semi-circular shape, an oval shape, a triangular shape, and the like, without any limitations. In the illustrated embodiment of FIG. 11A, each recess 222 has a substantially rectangular shape. Referring to FIGS. 11B, 11C, and 11D, the slot wall 220 may include the plurality of projections 224, 226, 228 (see FIGS. 11B, 11C, and 11D, respectively). In some examples, the projections 224, 226, 228 may be embodied as ribs, tabs, or textures. As illustrated in FIG. 11B, the projections 224 extending from the slot wall 220 may include a generally rectangular shape. As illustrated in FIG. 11C, the projections 226 extending from the slot wall 220 may include a generally square shape. As illustrated in FIG. 11D, the projections 228 extending from the slot wall 220 may be generally arrow shaped. Alternatively, the projections 224, 226, 228 extending from the slot wall 220 may include a circular shape, a semi-circular shape, an oval shape, a triangular shape, and the like, without any limitations.

Figure 12B:
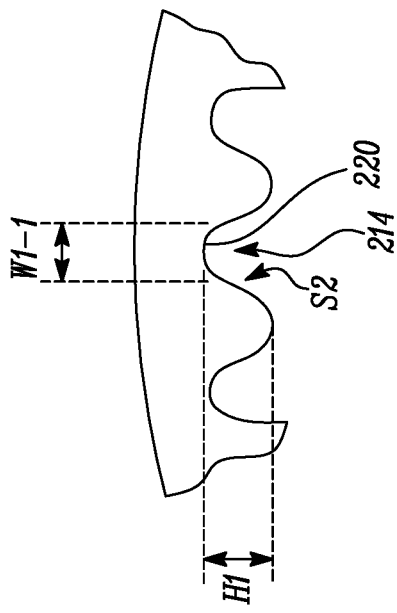
FIGS. 12A to 12E are respective schematic views illustrating slots having different cross-sectional shapes according to various embodiments of the present disclosure.
Figure 12C:
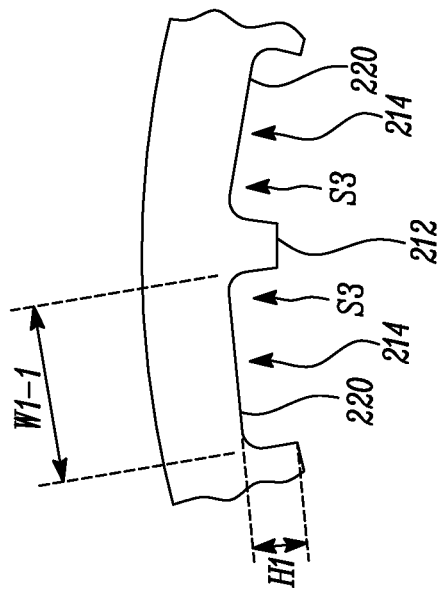
Figure 12A:
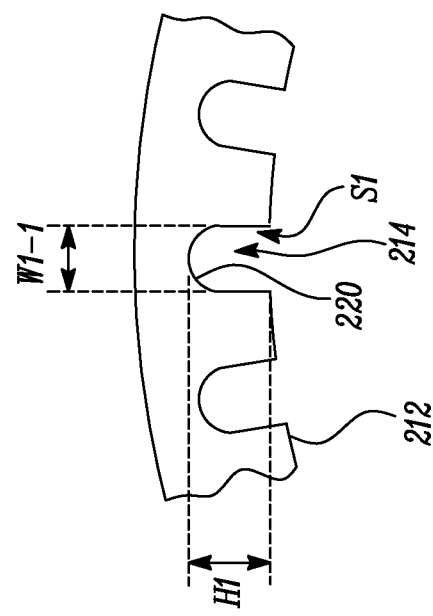
Figure 12E:
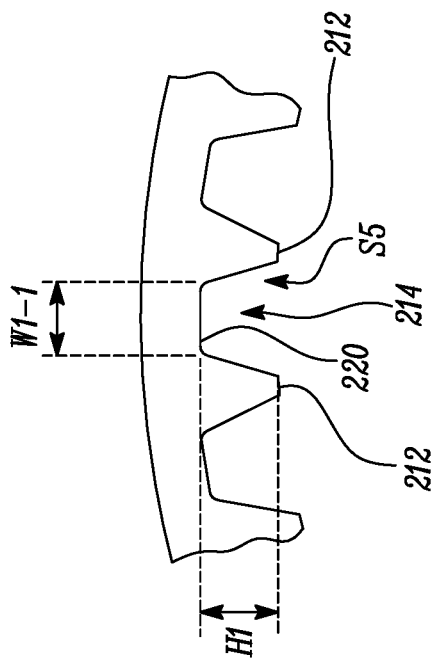
Figure 12D:
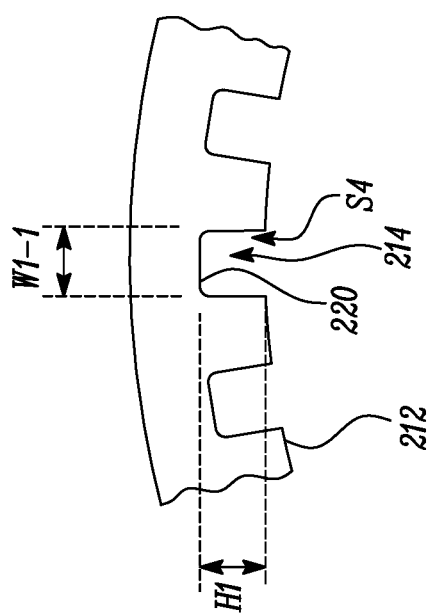

Further, referring to FIGS. 12A to 12E, each slot 214 may have a cross-sectional shape S1, S2, S3, S4, S5 (shown in FIGS. 12A, 12B, 12C, 12D, and 12E, respectively) that is at least one of semi-circular, rectangular, concave, square, and trapezoidal. In some examples, the cross-sectional shape S1, S2, S3, S4, S5 may have a high aspect ratio for increasing a heat transfer area within the slot 214. In some examples, the cross-sectional shapes S1, S2, S3, S4, S5 may include rounded corners that may simplify a manufacturing process of the slots 214 and may also reduce contact wear issues that may otherwise exist due to sharp edges. As shown in FIG. 12A, the cross-sectional shape S1 of each slot 214 may be semi-circular. As shown in FIG. 12B, the cross-sectional shape S2 of each slot 214 may be concave. Further, in the illustrated embodiment of FIG. 12B, the inner surface 212 of the annular body 206 may have a curved profile. As shown in FIG. 12C, the cross-sectional shape S3 of each slot 214 may be rectangular with rounded corners. As shown in FIG. 12D, the cross-sectional shape S4 of each slot 214 may be square with rounded corners. As shown in FIG. 12E, the cross-sectional shape S5 of each slot 214 may be trapezoidal with rounded corners. It should be noted that the present disclosure is not limited by a cross-sectional shape of the slots 214. Accordingly, the slots 214 may include any other cross-sectional shape, without any limitations.

Figure 13:
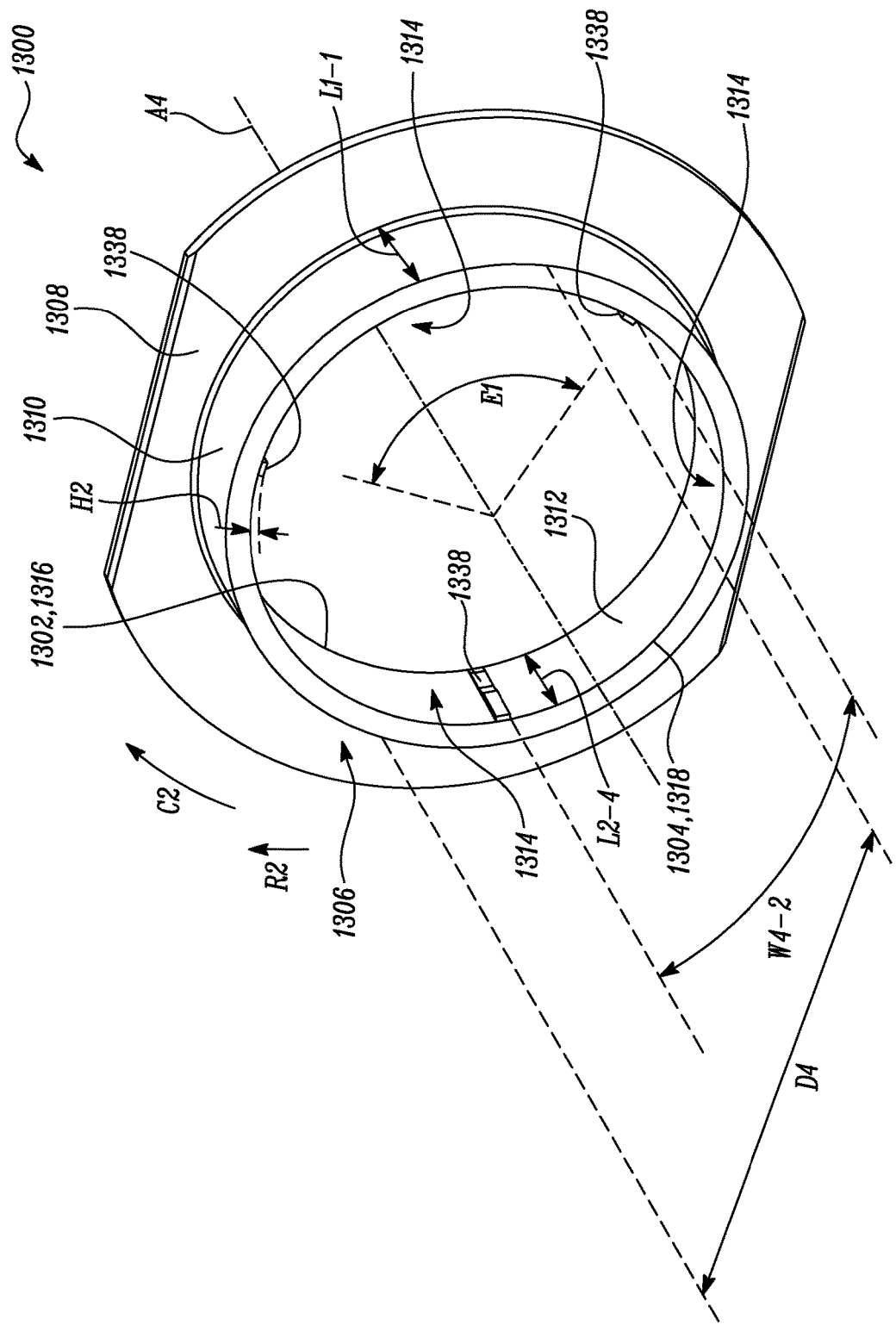
FIG. 13 illustrates a perspective view of a seal associated with the combustor arrangement of FIG. 4 according to another embodiment of the present disclosure.

FIG. 13 illustrates a seal 1300 associated with the combustor arrangement 100 (see FIG. 4), according to another embodiment of the present disclosure. The seal 1300 includes an upstream end 1302 and a downstream end 1304 similar to the upstream and downstream ends 202, 204 of the seal 200 shown in FIG. 6. Further, the seal 1300 includes an annular body 1306 at least partially abutting the fuel injector 114 (see FIG. 4) similar to the annular body 206 of the seal 200 shown in FIG. 6. The seal 1300 also includes a flange 1308 radially extending from an outer surface 1310 of the annular body 1306 at the upstream end 1302. The flange 1308 is similar to the flange 208 of the seal 200 shown in FIG. 6.

Further, the annular body 1306 defines an inner surface 1312 facing the fuel injector 114. The inner surface 1312 axially extends from the upstream end 1302 to the downstream end 1304. The annular body 1306 also includes the outer surface 1310 radially spaced apart from the inner surface 1312 relative to a central axis A4 and facing away from the fuel injector 114. The outer surface 1310 axially extends from the upstream end 1302 to the downstream end 1304. Further, the outer surface 1310 of the annular body 1306 has a substantially uniform outer diameter D4 along the central axis A4.

The annular body 1306 further includes a plurality of wall portions 1338 extending from the inner surface 1312 and circumferentially spaced apart from each other relative to the central axis A4. In other words, the wall portions 1338 are spaced apart from each other along a circumferential direction C2 defined with respect to the central axis A4. Each wall portion 1338 at least partially contacts the fuel injector 114. Moreover, the annular body 1306 includes a plurality of slots 1314 disposed on the inner surface 1312 and circumferentially spaced apart from each other relative to the central axis A4. Specifically, the slots 1314 are spaced apart from each other along the circumferential direction C2. Each slot 1314 is defined by the inner surface 1312 and a pair of corresponding adjacent wall portions 1338 from the plurality of wall portions 1338. Each slot 1314 axially extends at least partially from the downstream end 1304 to the upstream end 1302. Further, each slot 1314 is disposed in fluid contact with the fuel injector 114. In the illustrated embodiment of FIG. 13, the annular body 1306 includes three slots 1314. Alternatively, the annular body 1306 may include six slots 1314, nine slots 1314, twelve slots 1314, and the like, without any limitations.

Further, each slot 1314 extends from an upstream slot end 1316 disposed at the upstream end 1302 of the seal 1300 to a downstream slot end 1318 disposed at the downstream end 1304 of the seal 1300. Furthermore, a maximum slot length L2-4 of each slot 1314 may be substantially equal to a maximum axial length L1-1 of the annular body 1306. Specifically, as the upstream slot end 1316 of the slots 1314 may be disposed at the upstream end 1302 of the seal 1300, the maximum slot length L2-4 may be substantially equal to the maximum axial length L1-1. Moreover, each slot 1314 has a maximum radial height H2 along a radial direction R2 with respect to the central axis A4.

It should be noted that the details related to design, dimensions, and applications provided for the slots 214, 230, 232, 234, 236 (see FIGS. 8, 9A, 9B, 10B, and 10C, respectively) of the seal 200 may be equally applicable to the slots 1314 of the seal 1300, without any limitations.

In the illustrated embodiment of FIG. 13, each slot 1314 has a maximum angular extent E1 relative to the central axis A4. The maximum angular extent E1 may be less than 120 degrees. In various examples, the maximum angular extent E1 may be about 90 degrees, 60 degrees, 30 degrees, and the like. It should be noted that the maximum angular extent E1 may vary based on a total number of the slots 1314 associated with the annular body 1306. In the illustrated embodiment of FIG. 13, the maximum angular extent E1 may be slightly less than 120 degrees as the annular body 1306 includes three slots 1314. Further, each slot 1314 may define a maximum angular width W4-2 along the circumferential direction C2. In some examples, the maximum angular width W4-2 may be greater than the maximum radial height H2 by a factor of less than or equal to 90.

Referring to FIGS. 5 to 13, the seals 200, 1300 (see FIGS. 6 and 13) may be manufactured, for example, by casting. Subsequently, the seals 200, 1300 may be drilled using techniques, such as, electrochemical machining (ECM), electrical discharge machining (EDM), or laser drilling for forming the corresponding slots 214, 230, 232, 234, 236, 1314 (see FIGS. 8, 9A, 9B, 10B, 10C, and 13 respectively). In some examples, grinding or broaching may be used to manufacture the seals 200, 1300. In another example, the seals 200, 1300 may be manufactured by casting using cores to define the corresponding slots 214, 230, 232, 234, 236, 1314 and then removing the cores, such as, by dissolving. Alternatively, the seals 200, 1300 may be manufactured by additive layer manufacturing (ALM), e.g., three-dimensional printing, powder bed laser deposition, and the like. Thus, the seals 200, 1300 may be manufactured via a range of processes, thereby providing supply chain flexibility.

The seals 200, 1300 include the number of corresponding slots 214, 230, 232, 234, 236, 1314. The slots 214, 230, 232, 234, 236, 1314 may include an improved design such that the flow of the cooling fluid through the slots 214, 230, 232, 234, 236, 1314 may provide efficient cooling of the corresponding seals 200, 1300, and the fuel injector 114. Further, the seals 200, 1300 include a flare-less design. Elimination of the flared portion may reduce a possibility of accumulation of molten seal material proximal to the downstream ends 204, 1304 of the corresponding seals 200, 1300 and may also reduce smoke emissions. The slots 214, 230, 232, 234, 236, 1314 associated with the corresponding seals 200, 1300 may be embodied as substantially full-length slots 214, 230, 232, 234, 236, 1314. Further, the cooling fluid flowing through the substantially full-length slots 214, 230, 232, 234, 236, 1314 may allow cooling of the corresponding seals 200, 1300 as well as the fuel injector 114. Moreover, the spent cooling fluid may be then delivered locally to the fuel spray cone of the fuel injector 114 which may in turn provide a benefit to engine emissions in terms of smoke.

Further, in addition to reducing a temperature of the seals 200, 1300 and the fuel injector 114, the slots 214, 230, 232, 234, 236, 1314 in the corresponding seals 200, 1300 may also reduce smoke emissions in order to address issues associated with seal durability and engine emission certifications. The slots 214, 230, 232, 234, 236, 1314 may be disposed proximate to the inner surface 212, 1312 of the corresponding seals 200, 1300 which may enable high levels of convective heat transfer to occur between the cooling fluid and the seal 200, 1300. This feature may in turn provide a means to effectively cool hot portions of the seal 200, 1300 and the fuel injector 114. Moreover, a placement of the slots 214, 230, 232, 234, 236, 1314 proximal to the corresponding inner surfaces 212, 1312 may also generate a radial positive pressure at corresponding interfaces between the corresponding seals 200, 1300 and the outer diameter D1 of the fuel injector 114, which may in turn drive the cooling fluid by pressure. In some examples, a pressure differential across the corresponding seals 200, 1300 may create an aerodynamic bearing, which may reduce contact load and operational wear of the corresponding seals 200, 1300 and/or the fuel injector 114. This feature may also address durability issues associated with conventional seals that typically causes rapid oxidisation of conventional seals due to inadequate cooling. Further, the cooling fluid flowing through the slots 214, 230, 232, 234, 236, 1314 may enhance heat transfer at the outer diameter D1 of the fuel injector 114.

Moreover, as mentioned above, the design of the seals 200, 1300 described herein may address engine emission issues by realising an improved interaction of the cooling fluid with the fuel spray cone. Further, the cooling fluid may exit the slots 214, 230, 232, 234, 236, 1314 in close proximity to the fuel injector 114 which may allow control over a fuel spray cone angle. In some examples, by introducing the cooling fluid locally to the fuel spray cone, the fuel spray cone angle may be narrowed which may in turn reduce a residence time of the combustion process in a primary zone (i.e., a front section of the combustion chamber 102) that may be primarily responsible for production of smoke emissions. Further, the seals 200, 1300 described herein may be compact and light in weight. Moreover, the seals 200, 1300 may be retrofitted in existing combustor arrangements without making any changes to the combustor arrangements It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A combustor arrangement comprising:
   a fuel injector; and a seal arranged around the fuel injector and having an upstream end and a downstream end, the seal comprising:
an annular body at least partially abutting the fuel injector, the annular body extending circumferentially about a central axis and extending axially along the central axis from the upstream end to the downstream end, the annular body comprising:
an inner surface facing the fuel injector, the inner surface axially extending from the upstream end to the downstream end;
an outer surface radially spaced apart from the inner surface relative to the central axis and facing away from the fuel injector, the outer surface axially extending from the upstream end to the downstream end;
a plurality of slots disposed on the inner surface and circumferentially spaced apart from each other relative to the central axis, each slot axially extending at least partially from the downstream end to the upstream end, wherein each slot is disposed in fluid contact across a maximum slot length with the fuel injector; and
a flange radially extending from the outer surface of the annular body at the upstream end,
wherein the outer surface of the annular body has a substantially uniform outer diameter along the central axis from the flange to a most downstream terminal surface of the seal.

2. The combustor arrangement of claim 1, wherein each slot extends along a slot axis, and wherein the slot axis of each slot is parallel to or circumferentially angled relative to the central axis by an oblique angle.

3. The combustor arrangement of claim 2, wherein an angular width of each slot with respect to the central axis is uniform or variable along the slot axis.

4. The combustor arrangement of claim 3, wherein the angular width of each slot progressively increases or decreases from the upstream end to the downstream end.

5. The combustor arrangement of claim 4, wherein each slot has a maximum radial height along a radial direction with respect to the central axis, and wherein the maximum radial height of each slot is at most 90% of a maximum radial thickness of the annular body from the inner surface to the outer surface.

6. The combustor arrangement of claim 5, wherein each slot has a maximum angular width along a circumferential direction with respect to the central axis, and wherein the maximum angular width is equal to or different from the maximum radial height.

7. The combustor arrangement of claim 6, wherein the maximum angular width is greater than the maximum radial height by a factor of less than or equal to 90.

8. The combustor arrangement of claim 6, wherein the maximum angular width is less than the maximum radial height.

9. The combustor arrangement of claim 1, wherein the maximum slot length of each slot is less than the maximum axial length of the seal.

10. The combustor arrangement of claim 1, wherein the maximum slot length of each slot is substantially equal to the maximum axial length of the seal.

11. The combustor arrangement of claim 1, wherein each slot extends from an upstream slot end proximal to the upstream end of the seal to a downstream slot end disposed at the downstream end of the seal, and wherein the upstream slot end is axially spaced apart from the upstream end of the seal with respect to the central axis.

12. The combustor arrangement of claim 1, wherein the inner surface at least partially contacts the fuel injector, and wherein each slot radially extends from the inner surface partially towards the outer surface.

13. The combustor arrangement of claim 1, wherein the annular body further comprises a plurality of slot walls, each slot wall defining a corresponding slot from the plurality of slots, wherein the slot wall comprises at least one of a plurality of recesses and a plurality of projections.

14. The combustor arrangement of claim 1, wherein the annular body further comprises a plurality of wall portions extending from the inner surface and circumferentially spaced apart from each other relative to the central axis, wherein each wall portion at least partially contacts the fuel injector, and wherein each slot is defined by the inner surface and a pair of corresponding adjacent wall portions from the plurality of wall portions.

15. The combustor arrangement of claim 14, wherein each slot has a maximum angular extent relative to the central axis, and wherein the maximum angular extent is less than 120 degrees.

16. The combustor arrangement of claim 1, wherein the plurality of slots comprises at least three slots.

17. The combustor arrangement of claim 1, wherein each slot has a cross-sectional shape that is at least one of semi-circular, rectangular, concave, square, and trapezoidal.

18. The combustor arrangement of claim 1, wherein each slot has the maximum slot length along the central axis, and the maximum slot length of each slot is at least 90% of a maximum axial length of the seal from a most upstream terminal surface of the seal to the most downstream terminal surface of the seal.

19. The combustor arrangement of claim 1, further comprising a meter panel having a cold side and a hot side, the meter panel having an aperture extending through the meter panel between the hot and cold sides, wherein:
the seal is sized to fit through the aperture of the meter panel, such that the upstream end of the seal is proximal to the cold side of the meter panel and the downstream end of the seal is proximal to the hot side of the meter panel; and
each slot is configured to receive a cooling fluid at the upstream end of the seal and discharge the cooling fluid at the downstream end of the seal, such that the cooling fluid contacts the fuel injector while flowing through each slot.

* * * * *